(12) United States Patent
Hirshberg et al.

(10) Patent No.: US 10,356,389 B2
(45) Date of Patent: Jul. 16, 2019

(54) DISSIPATING AN ELECTROSTATIC CHARGE FROM AN OPTICAL ELEMENT

(71) Applicant: INTEL CORPORATION, Santa Clara, CA (US)

(72) Inventors: Arnon Hirshberg, D.N Misgav (IL); Barak Freedman, Yokneam (IL)

(73) Assignee: Intel Corporation, Santa Clara, CA (US)

( * ) Notice: Subject to any disclaimer, the term of this patent is extended or adjusted under 35 U.S.C. 154(b) by 780 days.

(21) Appl. No.: 14/865,330

(22) Filed: Sep. 25, 2015

(65) Prior Publication Data

US 2017/0088414 A1    Mar. 30, 2017

(51) Int. Cl.
| | |
|---|---|
| *G02B 26/10* | (2006.01) |
| *H05F 3/02* | (2006.01) |
| *G02B 1/11* | (2015.01) |
| *G02B 1/16* | (2015.01) |
| *G02B 26/08* | (2006.01) |
| *H04N 5/225* | (2006.01) |
| *H04N 13/204* | (2018.01) |

(52) U.S. Cl.
CPC ............. *H04N 13/204* (2018.05); *G02B 1/11* (2013.01); *G02B 1/16* (2015.01); *G02B 26/0833* (2013.01); *G02B 26/101* (2013.01); *H04N 5/2254* (2013.01); *H05F 3/02* (2013.01)

(58) Field of Classification Search
CPC .......... G02B 1/16; G02B 26/0833; H05F 3/02
USPC ....................................................... 361/212
See application file for complete search history.

(56) References Cited

U.S. PATENT DOCUMENTS

| | | | |
|---|---|---|---|
| 5,687,032 A | 11/1997 | Takeshita et al. | |
| 6,898,341 B2* | 5/2005 | Huang | G02B 6/3586 385/16 |
| 2014/0340811 A1* | 11/2014 | Pschenitzka | H05F 1/02 361/220 |

* cited by examiner

*Primary Examiner* — Dharti H Patel
(74) *Attorney, Agent, or Firm* — International IP Law Group, P.L.L.C.

(57) ABSTRACT

A method and apparatus for dissipating an electrostatic charge from an optical element are described. An apparatus includes the optical element, a microelectromechanical system (MEMS) device located proximate to the optical element, and a conductive coating over the optical element, wherein the conductive coating is substantially transparent, and wherein the conductive coating dissipates the electrostatic charge.

25 Claims, 8 Drawing Sheets

DISSIPATING AN ELECTROSTATIC CHARGE FROM AN OPTICAL ELEMENT

TECHNICAL FIELD

The present techniques relate generally to optical devices. More specifically the present techniques relate to optical devices that can be affected by electrostatic buildup on optical components.

BACKGROUND

Many optical devices are being developed that use micro-electro-mechanical systems (MEMS). MEM devices generally use integrated circuit fabrication techniques to form very small electromechanical parts, e.g., in the tens of micrometers in size or smaller. The small parts enable very fast movement, allowing high scanning speeds, e.g., for image generation in projectors or scanning in motion input systems.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Microelectromechanical systems (MEMS) allow for high performance optical systems, by creating small moving parts that are able to be moved at very high rates. For example, projector technologies have been developed that use an array mirrors that are each around 12 micrometers in size. The very small size allows the mirrors to move from a first position to a second position at speeds that allow smooth video projection. In other examples, MEMS mirrors may be used to form a scanning light beam that can be used for forming an image, such as by a time-of-flight system in a three-dimensional scanner.

The MEMS devices may use electromagnetic fields, electrostatic fields, or both, to move the mirrors. However, the calibration of the movement may be effect by the presence of electrostatic charges in the vicinity of the MEMS device, such as on nearby optics.

Techniques described herein mitigate the effects of an electrostatic charge building up on optical components by placing a transparent conductive coating over the optical component. The transparent conductive coating may dissipate the electrostatic charge, decreasing the chances that the electrostatic field may interfere with nearby MEMS devices.

Figure 1:
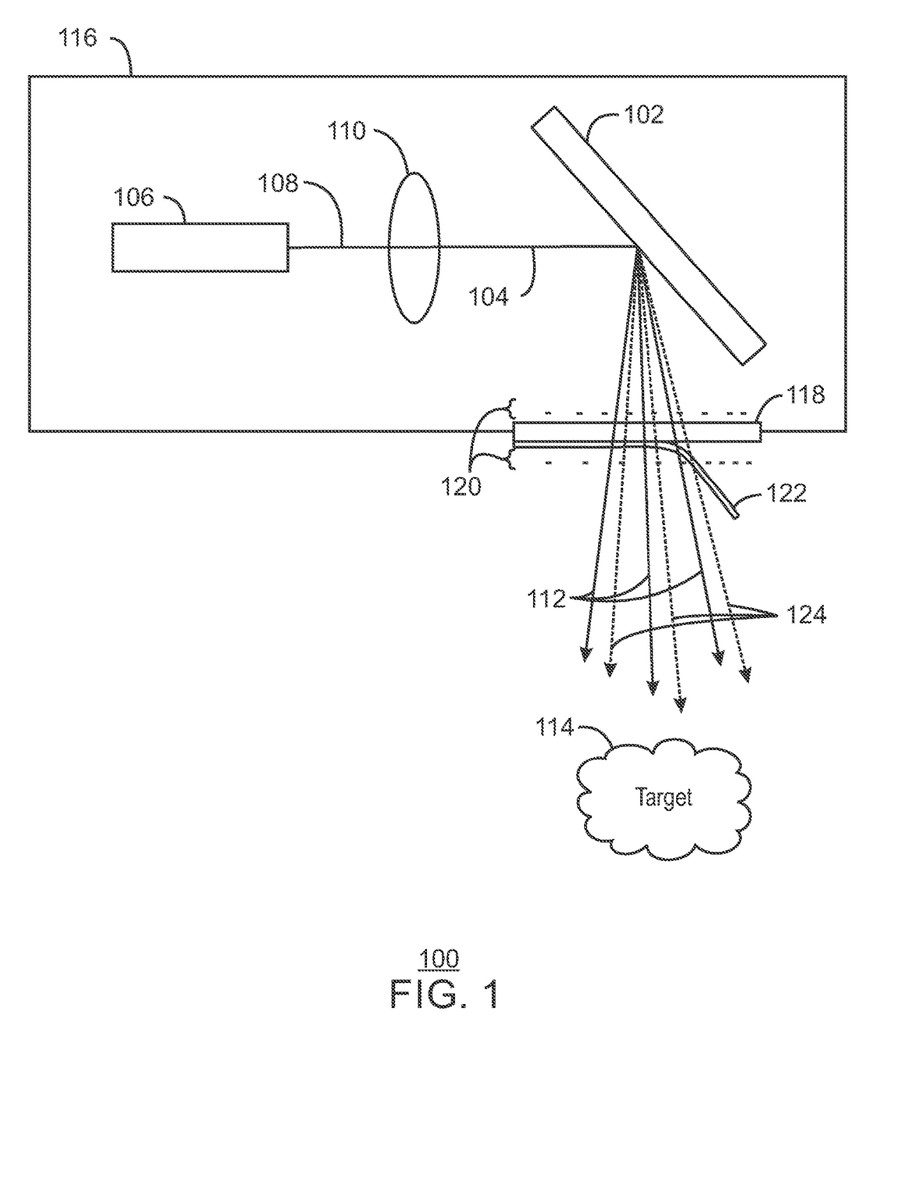
FIG. 1 is a drawing of an optical system using a micro-electro-mechanical system (MEMS) device to direct a collimated light beam.

FIG. 1 is a drawing of an optical system 100 using a micro-electro-mechanical system (MEMS) device 102 to direct a collimated light beam 104. The optical system 100 may use a light source 106, such as a light emitting diode LED, a laser LED, and the like, to generate a light beam 108. The light beam 108 may be a visible light or an infrared light, or include both. A lens 110 may be used to form the collimated light beam 104 from the light beam 108.

The MEMS device 102 may be moved to direct the collimated light beam 104 in a scanning pattern 112, for example, towards a target 114. The optical system 100 may be enclosed in a case 116 that has an optical element 118 to allow the light to exit the case 116, while protecting the components inside the case 116.

However, an electrostatic charge 120 may build up on the optical element 118. This may occur for various reasons, such as removal of a protective sticker 122 from the optical element 118 or during use if a user touches or cleans the optical element 118. The electrostatic charge 120 on the optical element 118 may affect the MEMS device 102, for example, at a mirror working point. The MEMS device 102 is calibrated at a certain electrostatic state of the optical element 118, and any change may result in scanning errors, for example, causing an offset scanning pattern 124.

If the protective sticker 122 is removed during manufacturing, such as before calibration, the calibration will then be performed with the electrostatic charge 120 on the optical element 118. The electrostatic charge 120 may dissipate, leaving an incorrect calibration, which may degrade future performance, e.g., by leaving the optical system 100 with an offset scanning pattern 124. Accordingly, application of a conductive coating may assist in dissipation of the electrostatic charge 120, improving performance.

Figure 2:
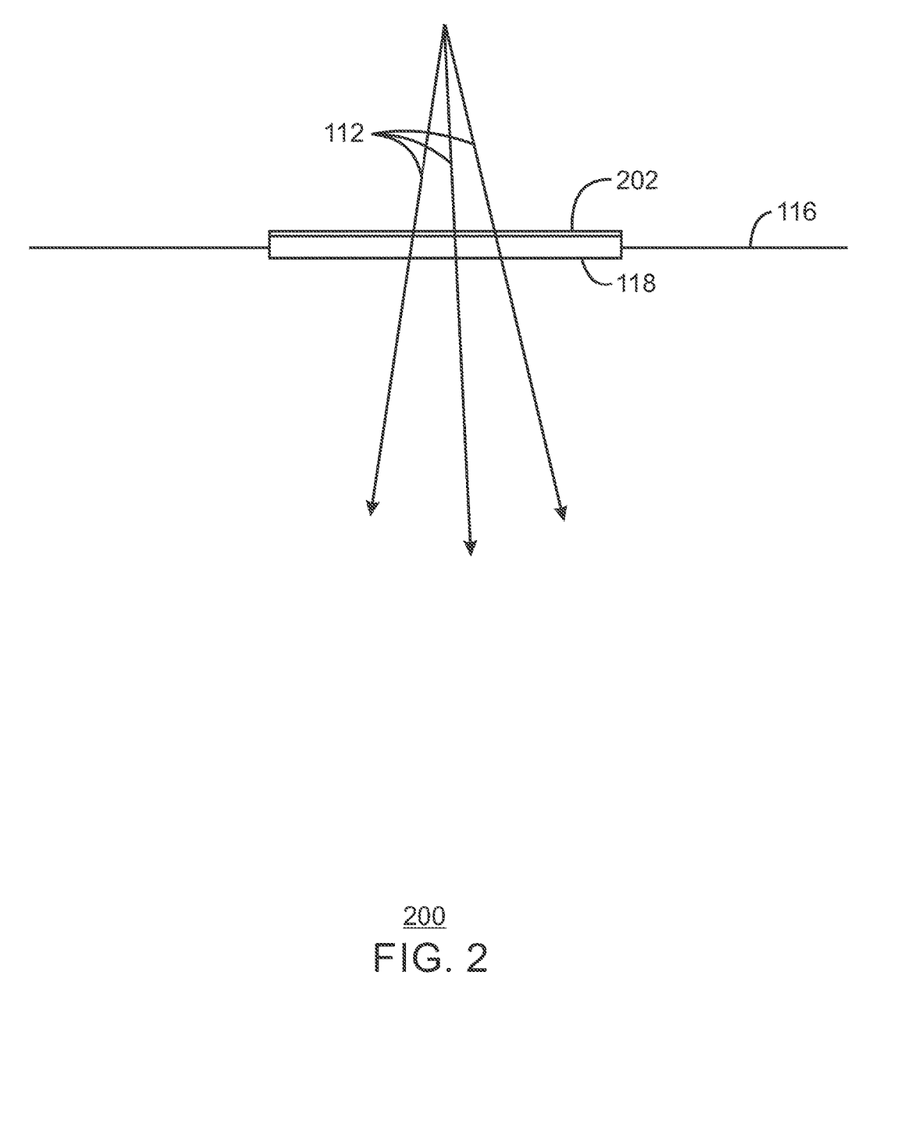
FIG. 2 is a drawing of an optical element having a conductive layer on one side to dissipate an electrostatic charge.

FIG. 2 is a drawing 200 of an optical element 118 having a conductive layer 202 on one side to dissipate an electrostatic charge. Like numbered items are as described with respect to FIG. 1. The conductive layer 202 may be selected to be substantially transparent at the wavelengths of interest, for example, in the infrared wavelength range or visible range, dissipating the charge while allowing the light beams of the scanning pattern 124 to pass through. For example, the conductive layer 202 may be formed from indium tin oxide (ITO), a metal layer, or other materials, such as a thin layer of carbon nanotubes, among others. The conductive layer 202 may be deposited by any number of technologies, such as sputtering, vapor deposition, and the like. As shown in the example of FIG. 2, the layer may be on the side of the optical element 118 facing inside the case 116, e.g., facing the MEMS device 102, as discussed with respect to FIG. 1. In some examples, the layer may be on the side of the optical element 118 facing outside of the case 116, e.g., opposite to the MEMS device 102, or on both sides, as described further with respect to FIG. 3.

Figure 3:
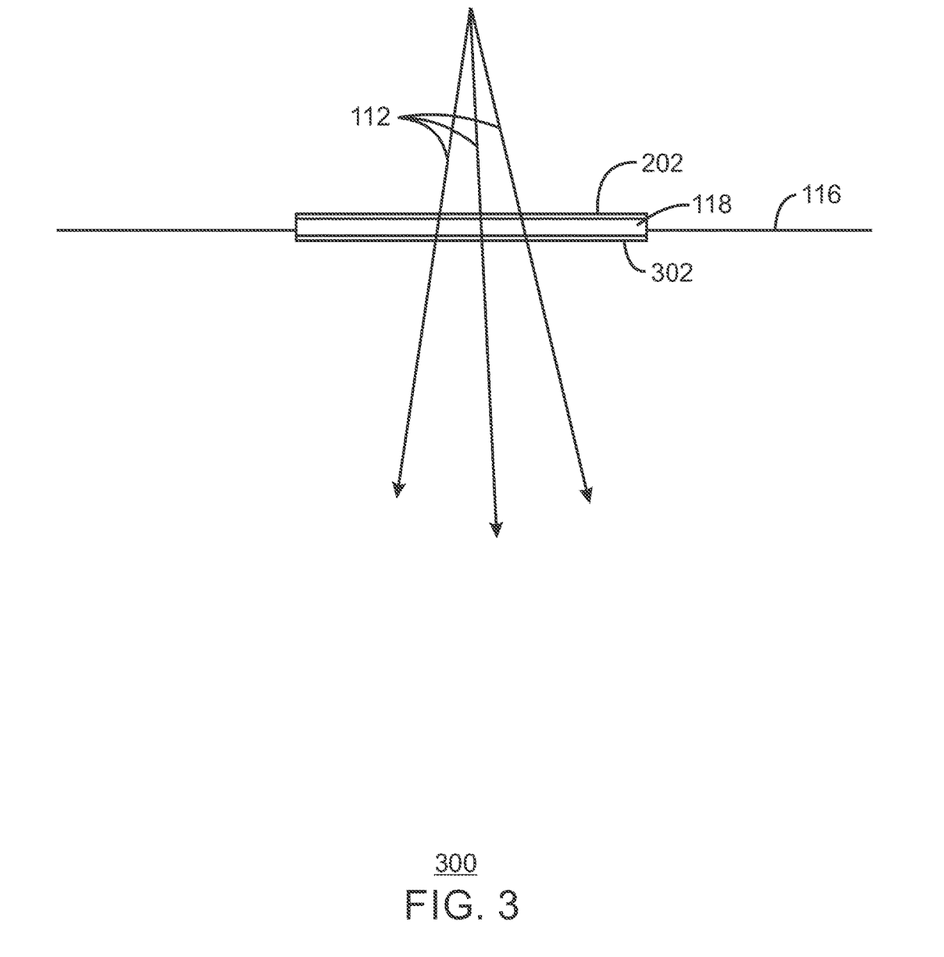
FIG. 3 is a drawing of an optical element using transparent conductive layers on both sides to dissipate a static charge.

FIG. 3 is a drawing 300 of an optical element 118 using transparent conductive layers 202 and 302 on both sides to dissipate a static charge. Like numbered items are as discussed with respect to FIGS. 1 and 2. The conductive layers 202 and 302 may be the same materials or may be different.

For example, a conductive layer 302 on an outside surface may be a sputtered metal, while a coating on an inside surface may be a layer of indium-tin-oxide.

Figure 4:
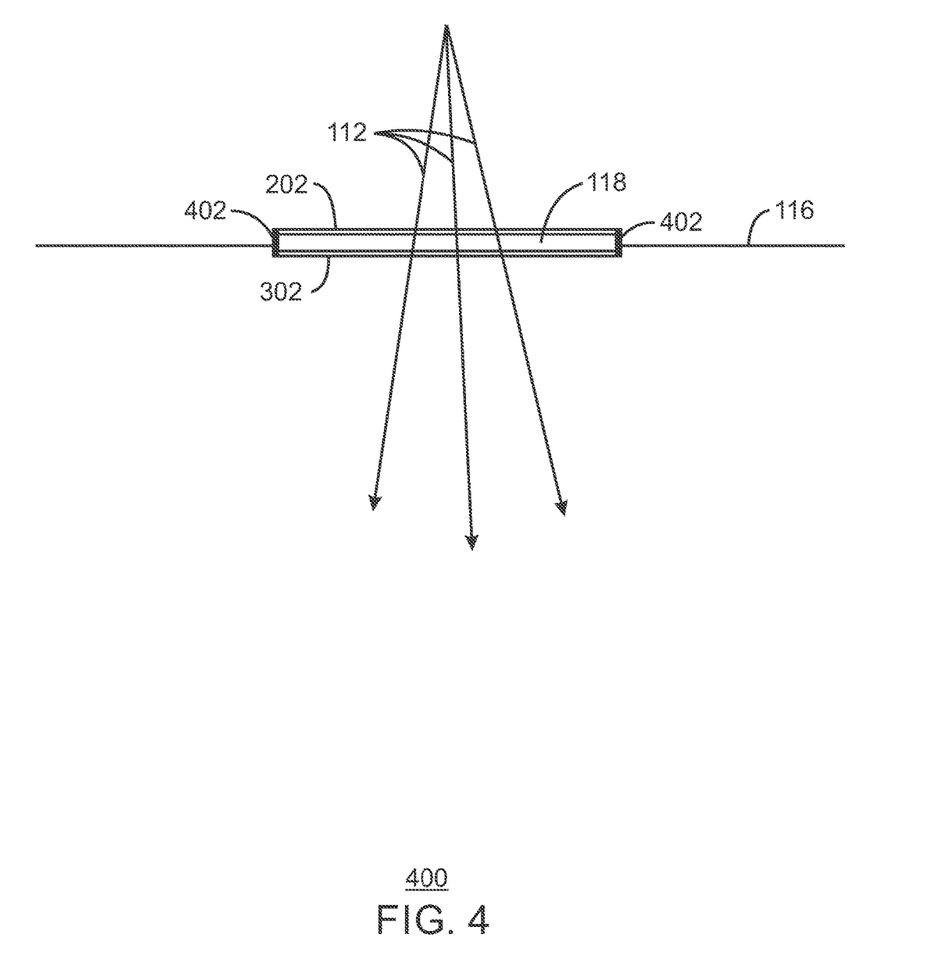
FIG. 4 is a drawing of an optical element in which a transparent conductive layer is grounded.

FIG. 4 is a drawing 400 of an optical element 118 in which a transparent conductive layer 202 or 302 is grounded, e.g., coupled to a ground connection. Like numbered items are as discussed with respect to the previous figures. To further dissipate an electrostatic charge, a coupling 402 may be used to ground one or more of the conductive layers 202 or 302. For example, the coupling 402 may be a conductive material, such as solder, applied to the outside of the optical element 118 to allow any charge to dissipate to ground through the case 116. In addition to grounding the conductive layers 202 or 302, additional layers may be applied to modify optical characteristics of the optical element 118.

Figure 5:
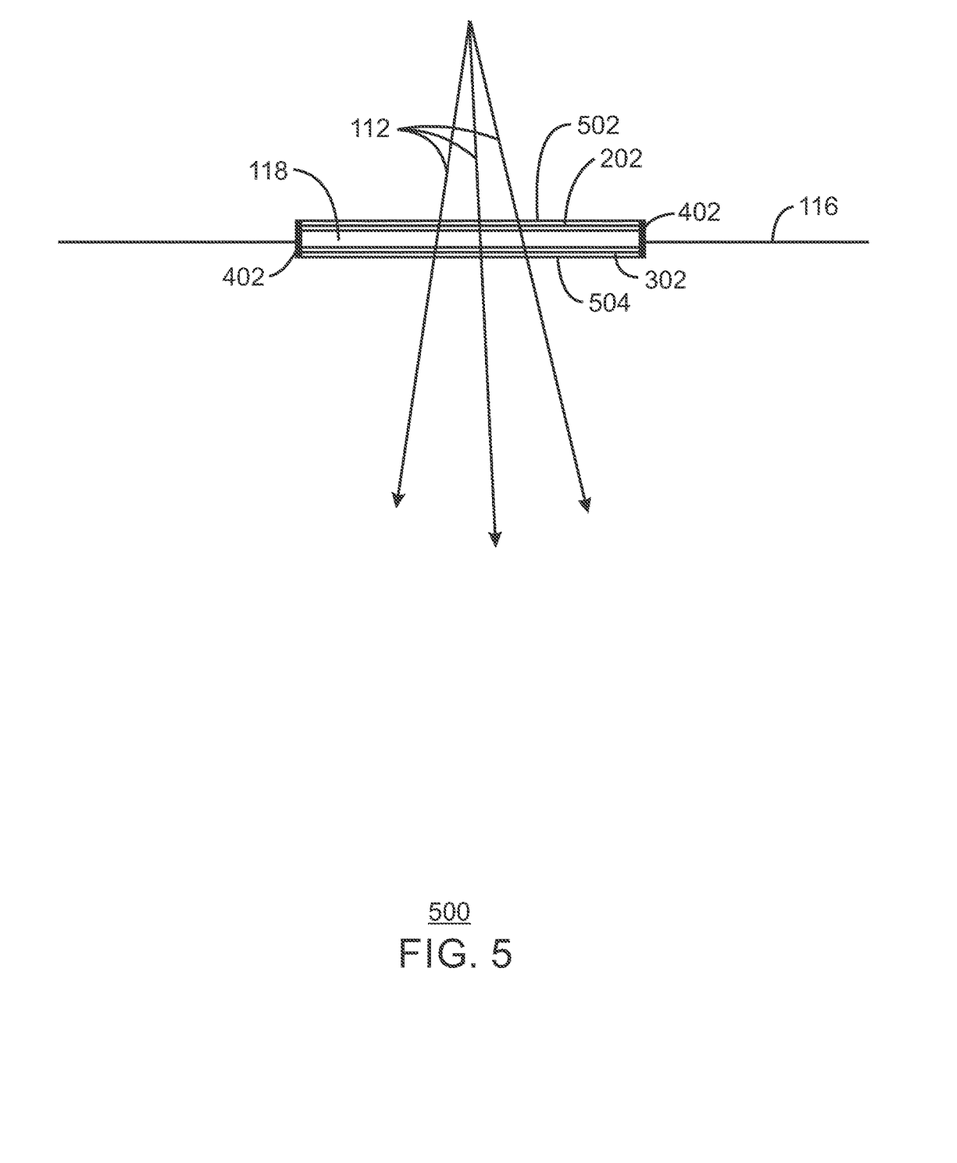
FIG. 5 is a drawing of an optical element with a transparent conductive layer on both sides, wherein additional layers are present to modify optical characteristics.

FIG. 5 is a drawing 500 of an optical element 118 with a transparent conductive layer 202 and 302 on both sides, wherein additional layers are present to modify optical characteristics. Like numbered items are as described with respect to previous figures. The conductive layers 202 or 302 may be applied to the window during other optical coating fabrication, along with antireflection (AR) layers 502 and 504, among others, such as scratch resistant layers. The AR layers 502 and 504 may be dichroic layers, multiple layer structures, and other AR materials known in the art. The AR layers 502 and 504 may be applied in different sequences with the conductive layers 202 and 302, depending on the types of additional coatings used. For example, an AR layer 502 may be applied over a conductive layer 202. In some examples, an AR layer 504 may be applied first, followed by an outer conductive layer 302. The decision for applying the layers may be made on the types of materials used. For example, a dichroic layer at an air interface may be more effective at decreasing reflections at the interface, but may be more fragile. Further, a conductive layer 504 may be more effective at dispersing an electrostatic charge when applied as an outer layer. In some examples, a scratch resistant coating may be applied as a final coating on an exterior surface of the optical element to protect it from damage.

Figure 6:
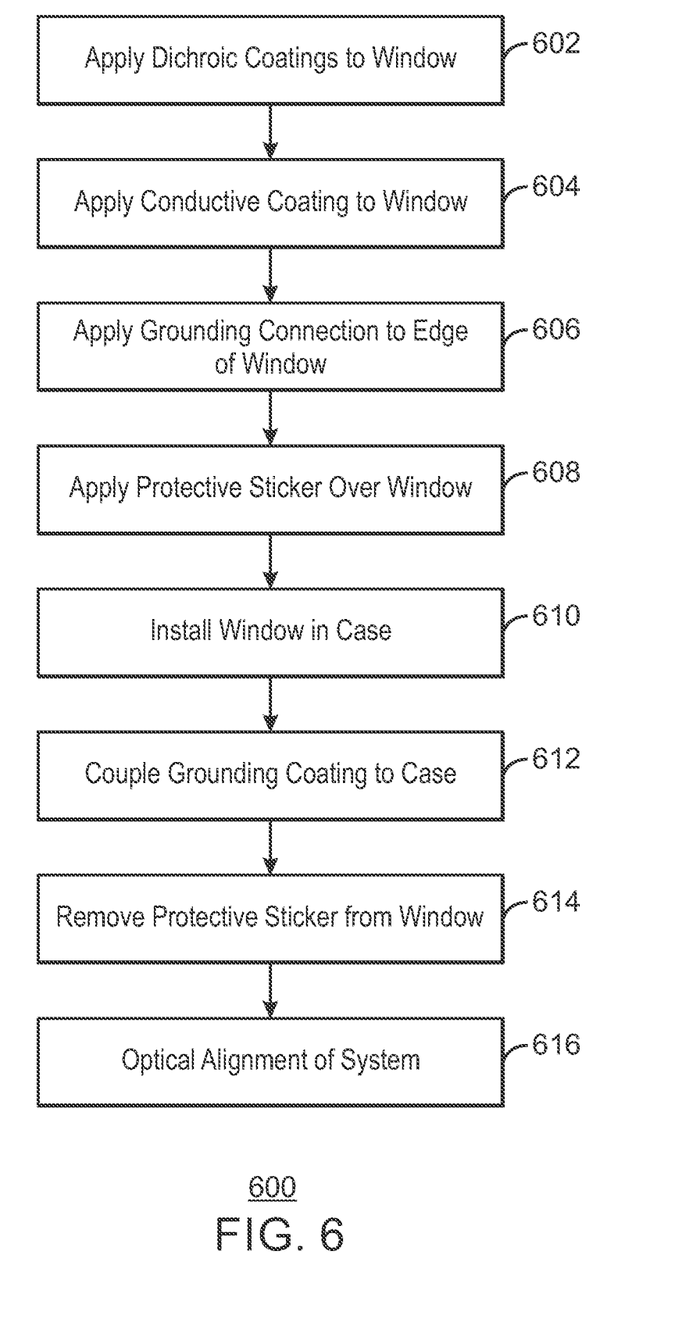
FIG. 6 is a block diagram of a method to form one or more layers of a transparent conductive material with other optical layers over an optical element.

FIG. 6 is a block diagram of a method 600 to form one or more layers of a transparent conductive material with other optical layers over an optical element. The method 600 may be used to create the structures described in FIGS. 2-5. The method 600 begins at block 602 with the application of dichroic coatings to the optical element, e.g., a window in a device case, among others. The dichroic coatings may be applied by any techniques known in the art, such as vapor deposition, and the like. At block 604, a conductive coating may be applied to the optical element. This may be done before the application of the dichroic coatings or after. Further, any number of other coatings and orders may be used in any order or sequences to one or both sides of the optical element.

At block 606, a grounding connection may be applied to the edge of the optical element to couple the optical element to a ground. At block 608 a protective sticker may be placed over the optical element to protect the optical element during assembly. The protective sticker may be placed before the application of the grounding connection to the edge of the optical element. At block 610, the optical element may be installed in a case. At block 612, the conductive coating may be coupled to a grounded element, such as a case. These functions may be performed in any number of orders, depending on the manufacturing process. For example, the optical element may be installed in a case or holder, and then the grounding connection may be applied to the edge of the optical element as the conductive layer is coupled to the ground.

At block 614, the protective sticker may be removed from the optical element. At block 616, the optical alignment of the system may be calibrated. In some cases, the protective sticker may be left on for removal by a consumer, or a new protective sticker may be applied. Not all of these functions may be performed in every example.

Figure 7:
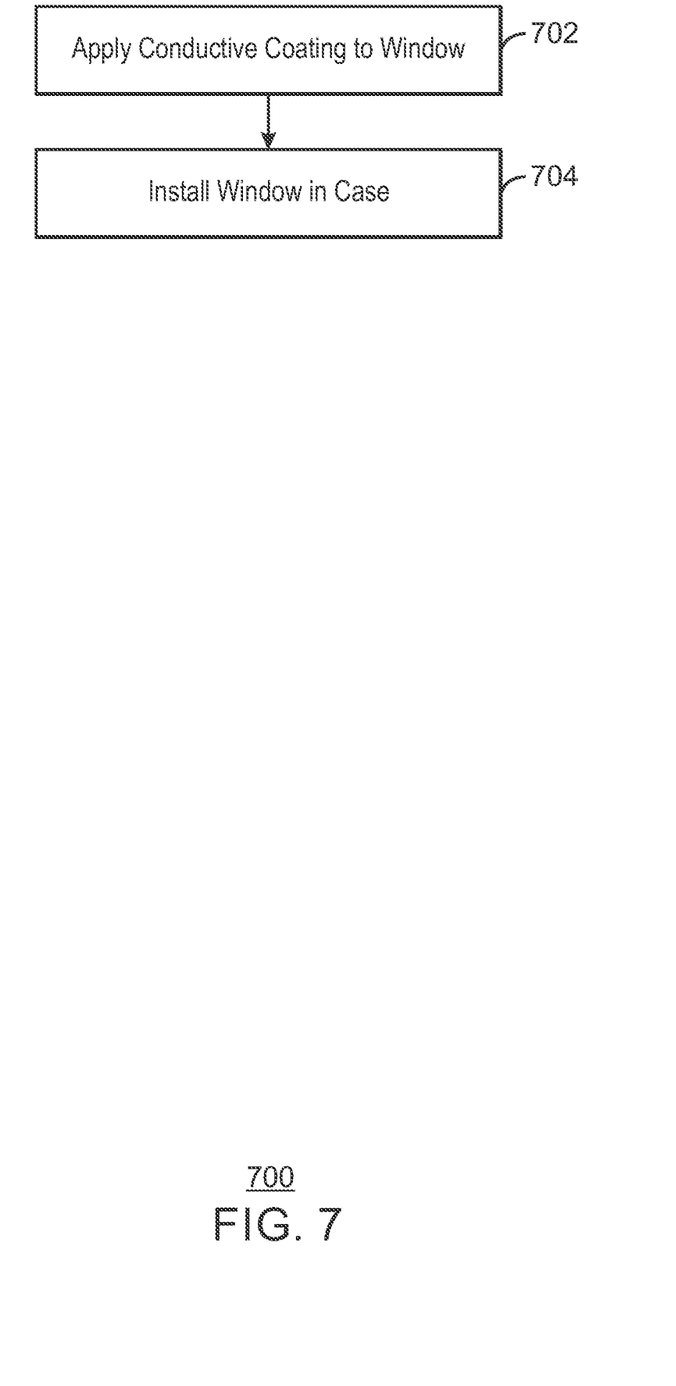
FIG. 7 is a block diagram of a simplified method for dissipating electrostatic charges from an optical window.

FIG. 7 is a block diagram of a simplified method 700 for dissipating electrostatic charges from an optical window. This method 700 may begin at block 702 with the application of the conductive coating to one or both sides of an optical element. At block 704, the optical element is installed in a case or holder.

Figure 8:
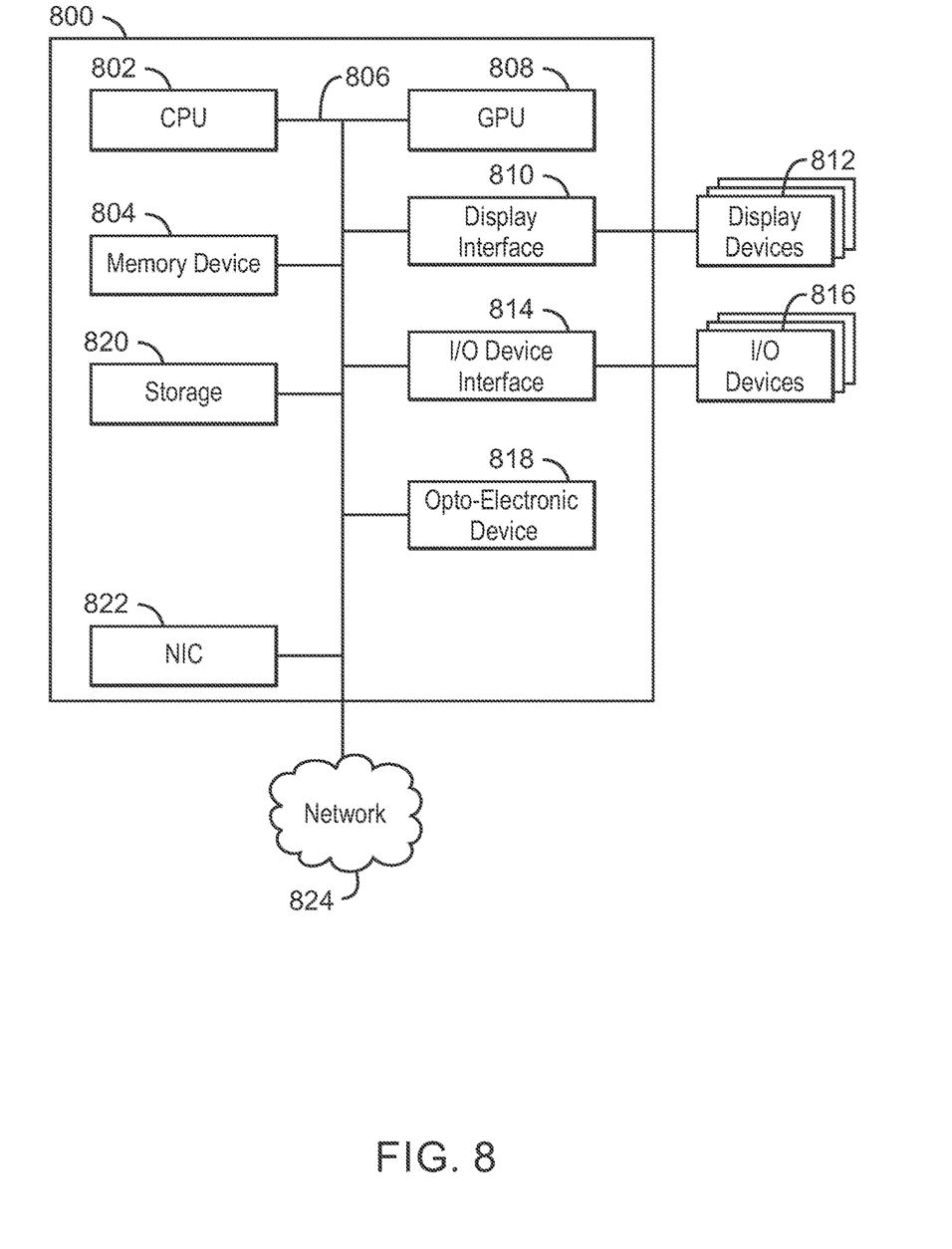
FIG. 8 is a block diagram of a computing device that includes a conductive coating over an optical element.

FIG. 8 is a block diagram of a computing device 800 that includes an optical element with a conductive coating. The computing device 800 can be, for example, a laptop computer, desktop computer, tablet computer, mobile device, or server, among others. In particular, the computing device 800 can be a mobile device such as a cellular phone, a smartphone, a personal digital assistant (PDA), phablet, or a tablet. The computing device 800 can include a central processing unit (CPU) 802 that is configured to execute stored instructions, as well as a memory device 804 that stores instructions that are executable by the CPU 802. The CPU can be coupled to the memory device 804 by a bus 806. Additionally, the CPU 802 can be a single core processor, a multi-core processor, a computing cluster, or any number of other configurations. Furthermore, the computing device 800 can include more than one CPU 802. The memory device 804 can include random access memory (RAM), read only memory (ROM), flash memory, or any other suitable memory systems. For example, the memory device 804 can include dynamic random access memory (DRAM).

The computing device 800 can also include a graphics processing unit (GPU) 808. As shown, the CPU 802 can be coupled through the bus 806 to the GPU 808. The GPU 808 can be configured to perform any number of graphics operations within the computing device 800. For example, the GPU 808 can be configured to render or manipulate graphics images, graphics frames, videos, or the like, to be displayed to a user of the computing device 800. In embodiments, the GPU 808 includes a number of graphics engines, wherein each graphics engine is configured to perform specific graphics tasks, or to execute specific types of workloads.

The CPU 802 can be linked through the bus 806 to a display interface 810 configured to connect the computing device 800 to a display device 812. The display device 812 can include a display screen that is a built-in component of the computing device 800. The display device 812 can also include a computer monitor, television, or projector, among others, that is externally connected to the computing device 800.

The CPU 802 can also be connected through the bus 806 to an input/output (I/O) device interface 814 configured to connect the computing device 800 to one or more I/O devices 816. The I/O devices 816 can include, for example, a keyboard and a pointing device, wherein the pointing device can include a touchpad or a touchscreen, among others. The I/O devices 816 can be built-in components of the computing device 800, or can be devices that are externally connected to the computing device 800.

The computing device 800 may also include also includes an optoelectronic device 818, including a MEMS device as described herein. For example, the optoelectronic device 818 may be a three dimensional scanner including an optical element with an electrostatic dissipative coating, as described herein. In embodiments, the optoelectronic device 818 may be associated with one or more imaging devices, such as a still shot camera, 3D camera, video recording device, and the like. The optoelectronic device 818 may be configured to allow non-contact input to the computing device, for example, by detecting the location of a user's fingers.

The computing device also includes a storage device 820. The storage device 820 is a physical memory such as a hard drive, a solid state drive, an optical drive, a thumbdrive, an array of drives, or any combinations thereof. The storage device 820 can also include remote storage drives such as used for cloud computing applications. The storage device 820 includes any number of applications that are configured to run on the computing device 800. These applications may include, for example, the operating system, application programs, and a non-contact input system using the optoelectronic device 818, among others.

The computing device 800 can also include a network interface controller (NIC) 822. The NIC 822 can be configured to connect the computing device 800 through the bus 806 to a network 824. The network 824 can be a wide area network (WAN), local area network (LAN), or the Internet, among others.

EXAMPLES

Example 1 includes an apparatus for dissipating an electrostatic charge from an optical element. The apparatus includes the optical element, a microelectromechanical system (MEMS) device located proximate to the optical element, and a conductive coating over the optical element, wherein the conductive coating is substantially transparent, and wherein the conductive coating dissipates the electrostatic charge.

Example 2 incorporates the subject matter of Example 1. In this example, the conductive coating is disposed on a side of the optical element facing the MEMS device.

Example 3 incorporates the subject matter of any of Examples 1 or 2. In this example, the conductive coating is disposed on the side of the optical element opposite the MEMS device.

Example 4 incorporates the subject matter of any of Examples 1 to 3. In this example, the conductive coating is disposed on the side of the optical element facing the MEMS device and disposed on the side of the optical element opposite the MEMS device.

Example 5 incorporates the subject matter of any of Examples 1 to 4. In this example, an electrical coupling is included connects the conductive coating to a ground connection.

Example 6 incorporates the subject matter of any of Examples 1 to 5. In this example, a dichroic layer is included proximate to the conductive coating.

Example 7 incorporates the subject matter of any of Examples 1 to 6. In this example, a dichroic layer is included on an opposite side of the optical element from the conductive coating.

Example 8 incorporates the subject matter of any of Examples 1 to 7. In this example, the conductive coating includes a layer of indium-tin-oxide (ITO).

Example 9 incorporates the subject matter of any of Examples 1 to 8. In this example, the conductive coating includes a metal coating.

Example 10 incorporates the subject matter of any of Examples 1 to 9. In this example, the conductive coating includes a silver coating.

Example 11 incorporates the subject matter of any of Examples 1 to 10. In this example, the MEMS device includes a mirror configured to scan a light beam across a target.

Example 12 incorporates the subject matter of any of Examples 1 to 11. In this example, the MEMS device includes a three-dimensional scanner.

Example 13 incorporates the subject matter of any of Examples 1 to 12. In this example, the optical element includes a window over the MEMS device.

Example 14 includes a method for protecting a microelectromechanical system (MEMS) device from effects caused by an electrostatic charge on an optical element. The method includes applying a conductive coating to the optical element, and installing the optical element in a case proximate to the MEMS device.

Example 15 incorporates the subject matter of Example 14. In this example, the conductive coating is applied to a side of the optical element to be installed facing towards the MEMS device.

Example 16 incorporates the subject matter of any of Examples 14 or 15. In this example, the conductive coating is applied to a side of the optical element to be installed facing away from the MEMS device.

Example 17 incorporates the subject matter of any of Examples 14 to 16. In this example, the conductive coating is applied to both sides of the optical element.

Example 18 incorporates the subject matter of any of Examples 14 to 17. In this example, the conductive coating is coupled to a ground connection.

Example 19 incorporates the subject matter of any of Examples 14 to 18. In this example, an optical coating is applied to the optical element, wherein the optical coating is selected to decrease reflections from a surface of the optical element.

Example 20 incorporates the subject matter of any of Examples 14 to 19. In this example, an indium-tin-oxide coating is applied to the optical element as the conductive coating.

Example 21 incorporates the subject matter of any of Examples 14 to 20. In this example, a metal coating is sputtered on the optical element as the conductive coating.

Example 22 includes an apparatus for dissipating an electrostatic charge from an optical element. The apparatus includes a means for transmitting light, and a means for dissipating the electrostatic charge to protect a MEMS device from effects caused by the electrostatic charge.

Example 23 incorporates the subject matter of Examples 22. In this example, the apparatus includes a means for passing the electrostatic charge to ground.

Example 24 incorporates the subject matter of any of Examples 22 or 23. In this example, the apparatus includes a means for decreasing reflections.

Example 25 incorporates the subject matter of any of Examples 22 to 24. In this example, the apparatus includes a means for scanning a light beam across a target.

Example 26 incorporates the subject matter of any of Examples 22 to 25. In this example, the apparatus includes a means for forming a three dimensional image.

Example 27 includes a computing device including an optoelectronic device. The optoelectronic device includes an optical element configured to allow light to pass from inside a case to outside the case, a microelectromechanical system (MEMS) device to control a mirror located proximate to the optical element, and a conductive coating over the optical element. The conductive coating is substantially transparent, and wherein the conductive coating dissipates an electrostatic charge.

Example 28 incorporates the subject matter of Examples 27. In this example, the computing device includes a collimated light source is directed at the mirror.

Example 29 incorporates the subject matter of any of Examples 27 or 28. In this example, the computing device includes a laser directed at the mirror.

Example 30 incorporates the subject matter of any of Examples 27 to 29. In this example, the computing device includes the conductive coating on a side of the optical element opposite the MEMS device.

Example 31 incorporates the subject matter of any of Examples 27 to 30. In this example, the computing device includes the conductive coating on the side of the optical element facing the MEMS device and on the side of the optical element opposite the MEMS device.

Example 32 incorporates the subject matter of any of Examples 27 to 31. In this example, the computing device includes an electrical coupling from the conductive coating to a ground connection.

Example 33 incorporates the subject matter of any of Examples 27 to 32. In this example, the computing device includes a dichroic layer proximate to the conductive coating.

Example 34 incorporates the subject matter of any of Examples 27 to 33. In this example, the computing device includes a dichroic layer on an opposite side of the optical element from the conductive coating.

Example 35 incorporates the subject matter of any of Examples 27 to 34. In this example, the conductive coating includes a layer of indium-tin-oxide (ITO).

Example 36 incorporates the subject matter of any of Examples 27 to 35. In this example, the computing device includes a three-dimensional scanner including the MEMS device.

Example 37 incorporates the subject matter of any of Examples 27 to 35. In this example, the computing device includes an imaging device.

Example 38 incorporates the subject matter of any of Examples 27 to 36. In this example, the computing device includes an imaging device including a still shot camera, a three dimensional (3D) camera, or a video recording device, or any combinations thereof.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus for dissipating an electrostatic charge from an optical element, comprising:
   the optical element;
   a microelectromechanical system (MEMS) device located proximate to the optical element;
   a conductive coating over the optical element, wherein the conductive coating is substantially transparent, and wherein the conductive coating dissipates the electrostatic charge; and
   a dichroic layer over the optical element proximate to or on an opposite side of the optical element from the conductive layer.

2. The apparatus of claim 1, comprising an electrical coupling from the conductive coating to a ground connection.

3. The apparatus of claim 1, wherein the dichroic layer is under the conductive coating.

4. The apparatus of claim 1, wherein the conductive coating comprises a layer of indium-tin-oxide (ITO).

5. The apparatus of claim 1, wherein the conductive coating comprises a metal coating.

6. The apparatus of claim 1, wherein the conductive coating comprises a silver coating.

7. A method for protecting a microelectromechanical system (MEMS) device from effects caused by an electrostatic charge on an optical element, comprising:
applying a conductive coating to the optical element;
applying a dichroic layer to the optical element proximate to or on an opposite side of the optical element from the conductive layer; and
installing the optical element in a case proximate to the MEMS device.

8. The method of claim 7, comprising applying the conductive coating to a side of the optical element to be installed facing towards the MEMS device.

9. The method of claim 7, comprising applying the conductive coating to a side of the optical element to be installed facing away from the MEMS device.

10. The method of claim 7, comprising applying the conductive coating to both sides of the optical element.

11. The method of claim 7, comprising coupling the conductive coating to a ground connection.

12. The method of claim 7, comprising applying the dichroic layer and then applying the conductive coating over the dichroic layer.

13. The method of claim 7, comprising sputtering a metal coating on the optical element as the conductive coating.

14. A computing device comprising an optoelectronic device, wherein the optoelectronic device comprises:
an optical element configured to allow light to pass from inside a case to outside the case;
a microelectromechanical system (MEMS) device to control a mirror located proximate to the optical element;
a conductive coating over the optical element, wherein the conductive coating is substantially transparent, and wherein the conductive coating dissipates an electrostatic charge; and
a dichroic layer over the optical element proximate to or on an opposite side of the optical element from the conductive layer.

15. The computing device of claim 14, comprising a collimated light source directed at the mirror.

16. The computing device of claim 14, comprising a laser directed at the mirror.

17. The computing device of claim 14, comprising the conductive coating on a side of the optical element opposite the MEMS device.

18. The computing device of claim 14, comprising the conductive coating on a side of the optical element facing the MEMS device and on the side of the optical element opposite the MEMS device.

19. The computing device of claim 14, comprising an electrical coupling from the conductive coating to a ground connection.

20. The computing device of claim 14 wherein the dichroic layer is under the conductive coating.

21. The computing device of claim 14, wherein the dichroic layer is over the conductive coating.

22. The computing device of claim 14, wherein the conductive coating comprises a layer of indium-tin-oxide (ITO).

23. The computing device of claim 14, comprising a three-dimensional scanner comprising the MEMS device.

24. The computing device of claim 14, comprising an imaging device.

25. The computing device of claim 24, wherein the imaging device comprises a still shot camera, a three dimensional (3D) camera, or a video recording device, or any combinations thereof.

* * * * *